Fig. 2

Oct. 22, 1940.   E. ORSHANSKY, JR   2,219,052
TRANSMISSION
Filed Sept. 17, 1938   5 Sheets-Sheet 3

Fig. 3

INVENTOR.
Elias Orshansky, Jr.
BY Duell, Kane and Smith
ATTORNEYS.

Oct. 22, 1940.  E. ORSHANSKY, JR  2,219,052
TRANSMISSION
Filed Sept. 17, 1938  5 Sheets-Sheet 4

INVENTOR.
Elias Orshansky, Jr.
BY Duell, Kane and Smoot
ATTORNEYS.

Fig. 6

Patented Oct. 22, 1940

2,219,052

UNITED STATES PATENT OFFICE 2,219,052

TRANSMISSION

Elias Orshansky, Jr., Deep River, Conn., assignor to The Acrotorque Company, New Haven, Conn., a corporation of Connecticut Application September 17, 1938, Serial No. 230,404

19 Claims. (Cl. 74—189.5)

This invention relates to a structurally and functionally improved hydraulic transmission capable of use in numerous different associations, but primarily intended to be employed in driving vehicles of different types.

It is an object of the invention to furnish a unit of this character which will embody true transmission rather than clutch characteristics, and by means of which power may be transmitted from a driving to a driven shaft or unit and in such manner that with constant conditions governing the driving shaft or input member, variable torque will be delivered by the output shaft or unit. As such, the present invention is of particular utility, not alone in connection with machine drives of varying scope, but is of especial value for transmitting driving forces in land vehicles such as tractors, buses, locomotives, and similar installations.

A further object is that of providing a unit of this character which will embody relatively few parts, each individually simple and rugged in construction, these parts being capable of assembly to furnish a compact and relatively light, inexpensive, apparatus which will operate over long periods of time with freedom from all difficulties.

A still further object is that of furnishing a mechanism which may be operated by a relatively unskilled person and in which the desired range of control may be accomplished in an extremely simple manner.

Another object is that of furnishing a structure in which the parts will be properly balanced so that unnecessary driving resistance will not be present, aside from the fact that frictional losses will be reduced to a minimum.

With these and other objects in mind, reference is had to the attached sheets of drawings, illustrating one practical embodiment of the invention and in which.

Figure 1:
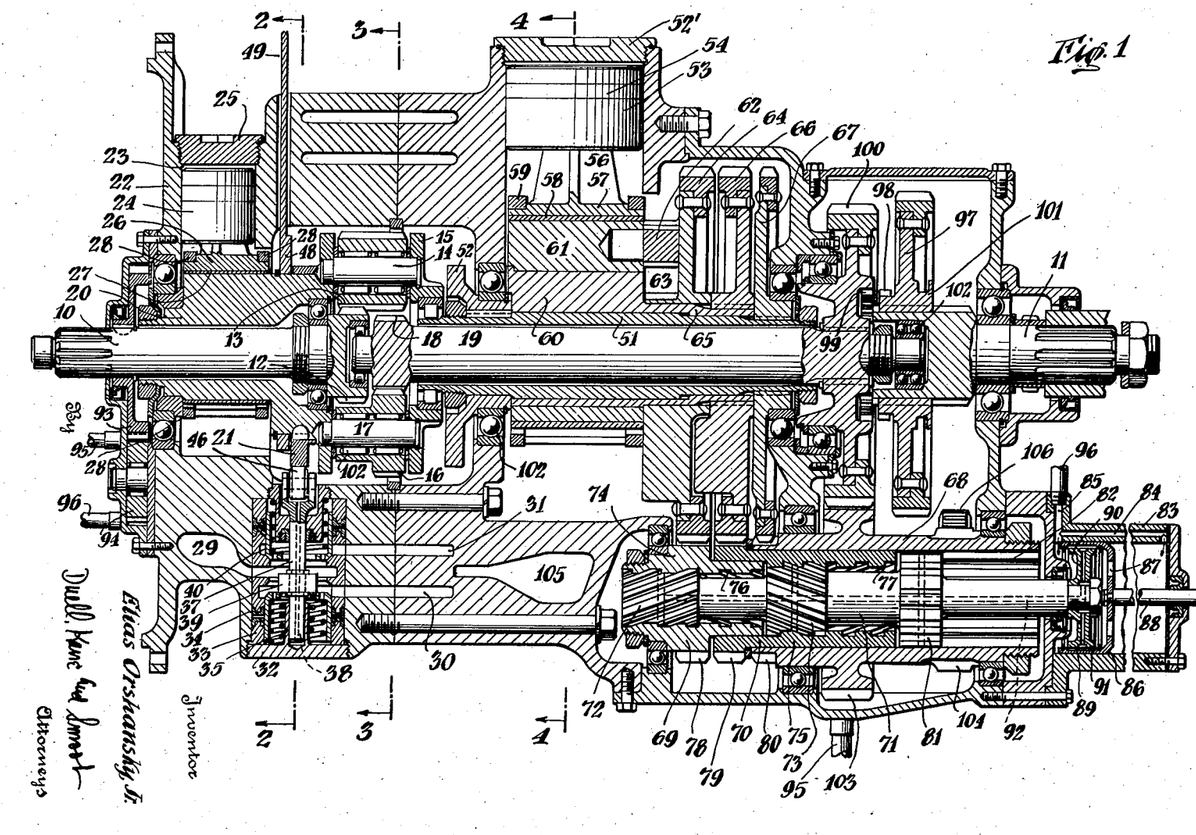
Fig. 1 is a sectional side view of one form of unit, this view being taken along varying planes.

Referring primarily to Fig. 1, it will be seen that the numeral 10 indicates the driving or input shaft of the unit, and 11 the driven shaft. Of course, these elements may be of any desired character, but ordinarily, as shown, they will be shafts, the first coupled to a prime mover such as an internal combustion motor, and the second coupled to a propeller shaft, axle, or other element to be driven. As illustrated, there may be interposed between the shafts 10 and 11 a mechanical drive. This may take the form of a planetary gear assembly including in the present instance a gear 12 fixed with respect to the shaft 10 and the teeth of which mesh with gears 13. These gears are supported by shafts 14 mounted by a cage assembly 15. It will be observed that the teeth of gears 15 have a length such that they extend beyond the teeth of gear 12 and at this point they engage the teeth of gears 16 mounted by rollers 17 also supported by the cage assembly.

Figure 3:
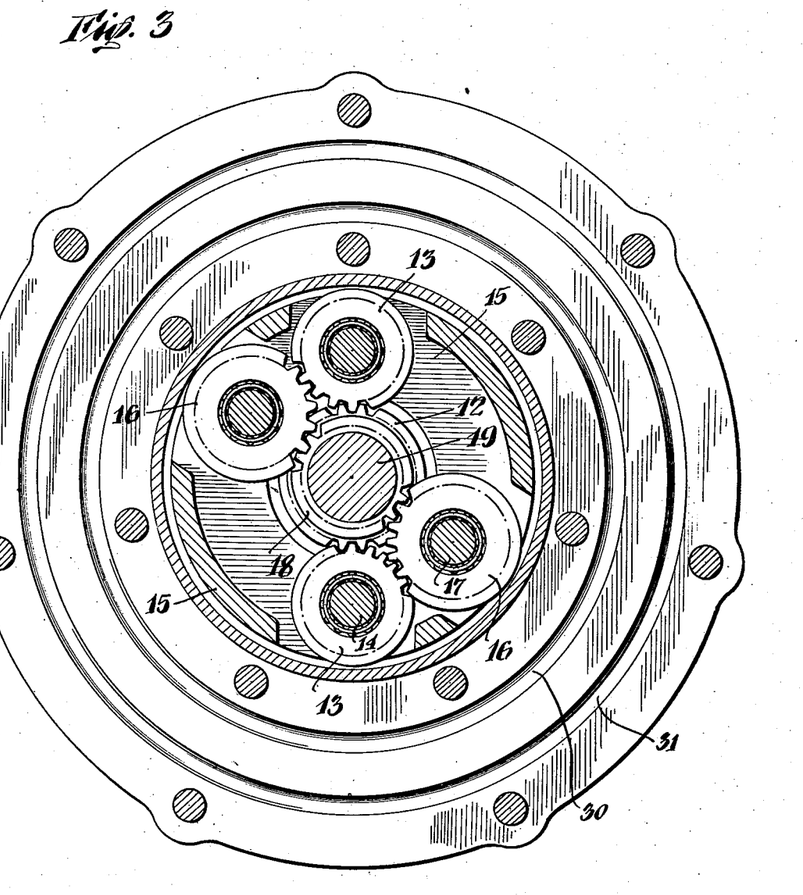

As illustrated in Fig. 3, a pair of gears 13 and a pair of gears 16 are employed. Obviously, a greater or a lesser number of units might be employed. In any event, the teeth of gear 16 additionally engage a gear 18 secured to, or forming a part of a shaft 19, so that if the cage assembly is not free to rotate and shaft 10 is rotated, shaft 19 will be rotated. Due to the fact that the diameter of gear 12 is preferably in excess of the diameter of gear 18, an over-drive will be present at this point. In other words, if the cage assembly is stationary and shaft 10 is given a certain number of rotations, shaft 19 will rotate in the reverse direction through a greater number of revolutions.

Fixed against movement with respect to the cage assembly 15, or, in fact, integral therewith, is an eccentric 20. This member encircles shaft 10 and has affixed to it a cam ring 21. A portion of the casing is extended as at 22 to provide a plurality of cylinders 23. These cylinders are arranged in the form of a radial series and as illustrated are seven in number. No section illustrating this specific number of pump cylinders has been taken in that it is believed such a view is unnecessary to a complete understanding of the case and having in mind that a similar section has been shown in connection with a similar structure and will hereinafter be described.

Within each of these cylinders a piston 24 is positioned and the outer end of each cylinder may be closed by a removable head member 25 which, as shown, may be threaded to engage a corresponding part of the casing 22. The pistons are connected to eccentric 20 by means of connecting rods terminating in slipper elements 26. These slipper elements will be described in greater detail in the following description of the motor, but at this time it will be observed that they preferably bear against a layer or ring 27 of metal which encircles eccentric 20 and are maintained in contact with such layer by retaining rings 28 extending into recesses formed in such slipper element.

Communicating with each of the cylinders 23 is a port continued in the form of a passage 29, one of which is provided for each of the cylinders, and serves to permit a flow of fluid towards and away from the same. This flow is controlled to enter high pressure passages 30 or to flow from low pressure passages 31. These passages are formed in the main block of the unit and interposed between the same and passage 29 is a valve mechanism which is shown to best advantage in Figs. 2 and 6.

Figure 2:
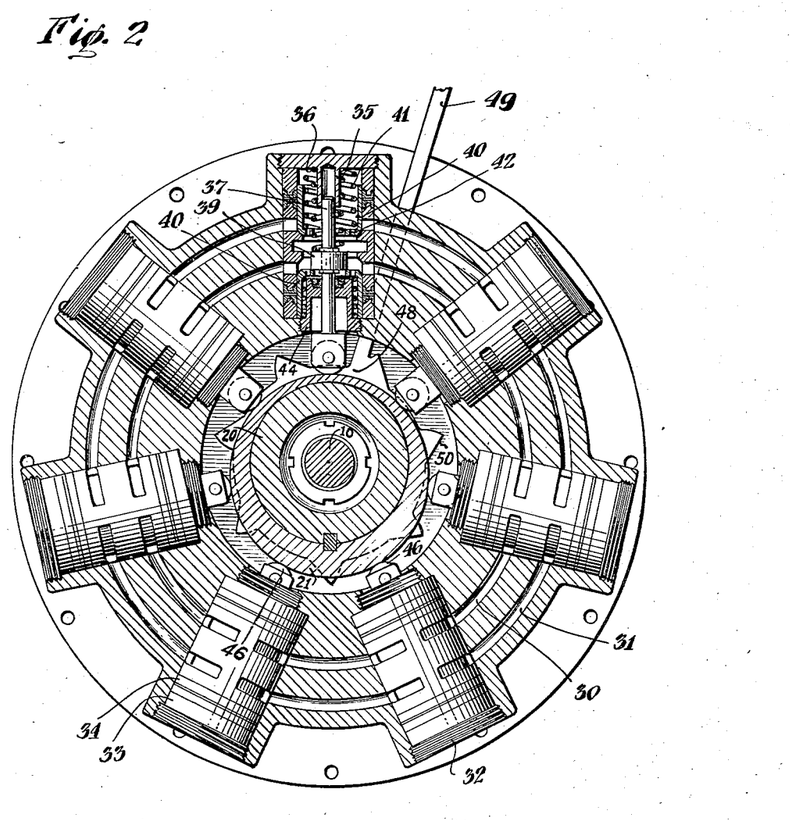
Figs. 2, 3 and 4 are transverse sectional views taken along the lines 2—2, 3—3 and 4—4, respectively, and in the direction of the arrows of Fig. 1.
Figure 6:
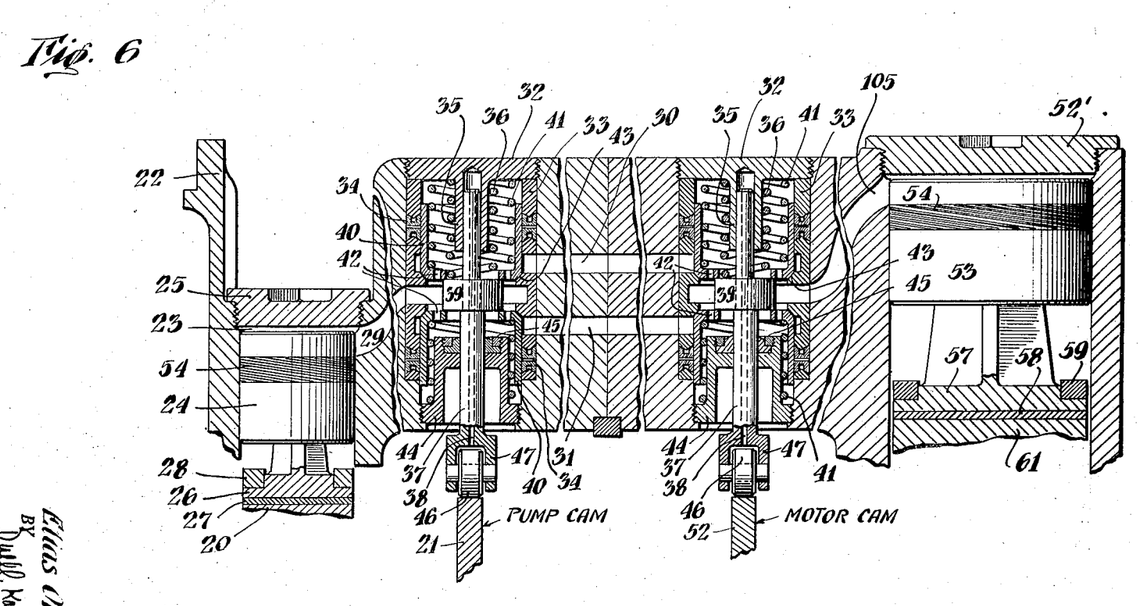
Fig. 6 is a development showing in somewhat enlarged section the structure interposed between the pump and motor.

In view of the fact that the valve units controlling both the pump and motor are substantially identical, it is believed that a description of the parts of one will suffice for both. Thus: the numeral 32 indicates a cap which closes the outer end of a bore formed in the block unit. Seven valve assemblies are furnished for the pump and a corresponding number are provided for the motor. Liner sections 33 may be disposed within this bore and packing assemblies 34 are mounted between the sections and serve to prevent any material escape or seepage or liquid. Cap 32 may be furnished with an inwardly extending guide socket 35 encircled by a spring 36. A valve actuating rod 37 may have its outer end extending into socket 35 and be provided with a bore 38. A block or collar 39 is carried by, or forms a part of rod 37 and the inner end of spring 36 bears against this element to constantly urge rod 37 inwardly. Valves in the form of cups 40 slidably bear against the liner sections 33 and packing assemblies 34. As will be observed, the cup members 40 forming a part of each valve assembly are arranged with their base portions extending towards each other and so that springs 41 normally urge the same into contact with the collar 39 carried by rod 37. The base portions of these members are preferably formed with openings 42 and those liner sections which are adjacent the collar 39 are extended so as to provide valve seats 43 against which the edges of the cup members bear to provide, in effect, line seals. At this time it will be observed that the exposed areas of the different valves of each assembly equalize each other so that at no time will there be a tendency of a valve to tend to cause a functioning of the other. Also, the individual opposed surfaces of each valve are equalized so that the individual valve elements will not tend—incident to the flow of fluid under high pressure—to move in either direction.

Thus, it will be seen that valve structures are provided which serve to interrupt the flow of oil or other fluid past their surfaces. Consequently, leakage is substantially precluded irrespective of the viscosity, temperature and the pressure under which the power transmitting fluid is operating. The prevention of flow past the cooperating seat and body surfaces is obvious. Likewise, it is obvious that no substantial leakage can occur around the valve bodies because of the packing. Additionally, the valves, in operating, will not act with or against a head of pressure, and no pumping will occur. Also, with the substantial equalization of pressures acting on the valve surfaces, only minimum force will be required to seat and unseat the latter, and thus high mechanical losses will not be involved.

The inner end of each of the bores is closed by a plug 44 apertured to permit of passage of the rod 37 and conveniently mounting at this point a packing 45 to prevent an escape of liquid. It will, also, be noted at this time that the force necessary to compress spring 36 is greater than that necessary to compress spring 41 associated with the innermost cup member. Accordingly, if rod 37 does not prevent such movement, spring 36 will cause collar 39 to bear against the innermost cup member 40 of the assembly to unseat the latter against the action of the innermost spring 41. Each one of rods 37 may have a fork portion 47 adjacent its inner end and which mounts a roller 46. The latter rides against the edge of cam 21 and as will be obvious, this cam may move rod 37 outwardly to thus cause an unseating of the outermost cup member 40 and allow a flow from passage 30 to passage 29.

Now with a view to providing a structure which will permit of the valve units of the pump being rendered inoperative, it will be observed that eccentric 20 is encircled by a ring 48, capable of being oscillated by means of a hand lever 49, or any other suitable control. This ring presents cam or wedge portion 50, one for each of the valve assemblies. These portions conveniently lie adjacent one of the arms of the forked members 47. Consequently, the valve assemblies will normally be actuated by the cam 21, but when desired, and for a purpose hereinafter brought out, this cam may be rendered inoperative to cause an actuation of the parts by simply shifting ring 48 so that the portions 50 thereof move each of the rods 37 of the valve assemblies for the pump, outwardly.

Figure 4:
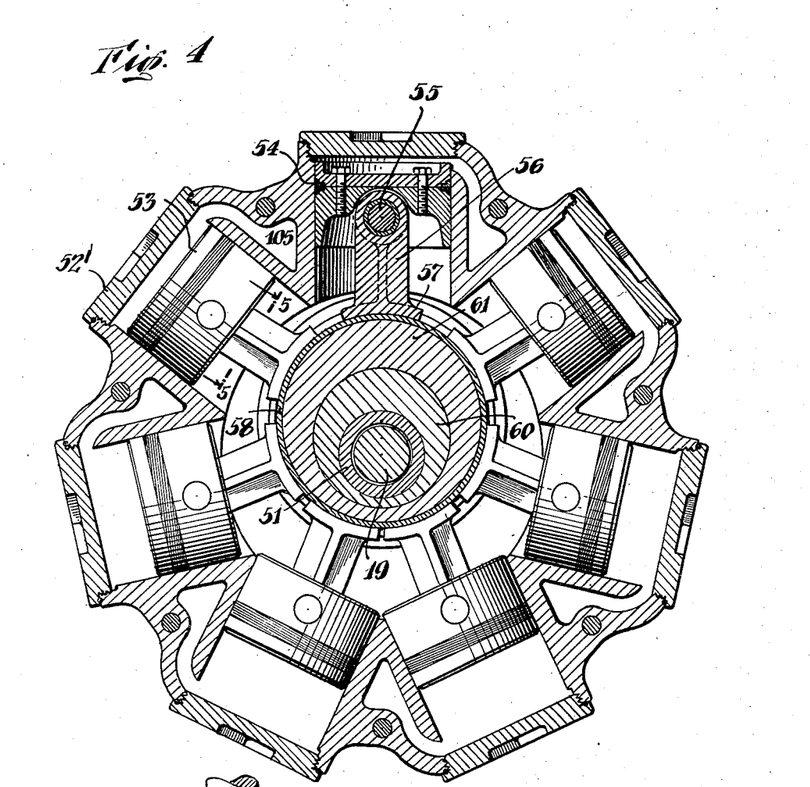
Figure 5:
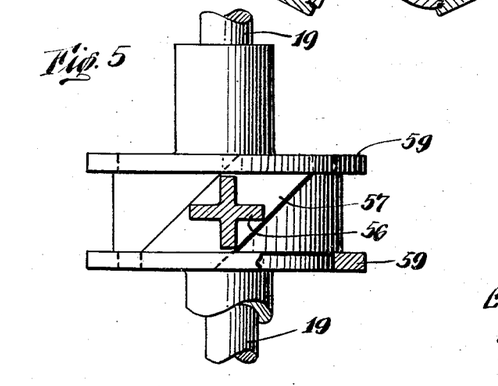
Fig. 5 is a sectional plan view taken along the lines 5—5 and in the direction of the arrows of Fig. 4.

Encircling shaft 19 is a sleeve 51 which has affixed to it the cam 52 serving to actuate the valve assemblies of the motor. The latter, as shown especially in Fig. 4, also number seven cylinders, the outer ends of which may be closed by removable heads 52' and within each of which piston 53 is reciprocable. Referring to these pistons it will be observed that they may include a pair of sections conveniently bolted together and having interposed between them packing assemblies 54. Also, each of these pistons mounts a wrist pin 55 to which the connecting rod 56 is coupled. The lower end of this rod may terminate in a slipper element 57 which, as is especially shown in Fig. 5, extends at an angle with respect to the axis of shaft 19 and sleeve 51. As a consequence of this construction adequate stability is incorporated in these elements so that they will not tend to "ride up" on one of their side edges, even when the connecting rods are subjected to dislocating stresses. It is also to be understood that the foregoing structure is preferably embodied in the slipper elements 26, pistons 24, etc., as heretofore described in connection with the pump. Also, the slipper elements 57 of the motor are preferably retained in contact with a bearing layer 58 by being recessed similarly to the manner in which slipper elements 26 are recessed, and these recesses of the slipper elements 57 receive retaining rings 59 corresponding to ring 28.

Encircling sleeve 51 is an eccentric 60 which is in turn encircled by an eccentric 61, the value of each of these eccentrics being preferably equal. Eccentric 61 carries a pin 62, riding within a radially extending slot or guide 63, forming a part of gear element 64. This gear element loosely encircles an extension 65 which forms a part of eccentric 60. A gear element 66 is coupled to this extension and it will be observed that sleeve 51 is extended to mount against movement with respect thereto a gear element 67 positioned beyond element 66. It will thus be understood that by controlling the gear elements, the positions of the eccentrics may be controlled. Now, to effect a movement of such gear elements the unit rotatably mounts a sleeve 68 which encloses sleeves 69 and 70, the latter being telescopically disposed with reference to each other. In turn, enclosed within the innermost sleeve 69 is a shaft 71 which has integral with, or fixedly secured to it, a pair of portions 72 and 73, presenting teeth or ribs extending angularly to the axis of shaft 71 and in opposed directions with respect to each other, it being observed that the "pitch" of the ribs or teeth of units 72 and 73 is equal.

Hubs 74 and 75 enclose portions 72 and 73 and are formed with spirally extending grooves 76 and 77 respectively, within which the teeth or ribs of portions 72 and 73 ride. Hub 74 is formed with, or carries a gear 78 which meshes with the teeth of gear 64, while hub 75 presents teeth 79 which mesh with the teeth of gear 66. Finally, it will be noted that sleeve 68 presents a gear portion 80 the teeth of which mesh with the teeth of gear 67 and that a relative rotation of sleeve 68 and shaft 71 is prevented, incident to a guide member 81 forming a part of the shaft and which engages guiding flanges or rails 82 formed in the inner face of sleeve 68.

It follows that if rod 71 is projected, sleeves 74 and 75 will be rotated in opposite directions and to a corresponding and equal amount. Incident to such rotation gears 64 and 66 will likewise be moved in opposite directions and this movement will cause a corresponding shifting of eccentrics 60 and 61. Thus, while the stroke of pistons 53 will be varied, the timing of the mechanism will not be altered, bearing in mind that unless sleeve 68 is rotated, gear 67 will not be moved and consequently cam 52 will not be shifted.

In order to provide a mechanism which will effectively shift shaft 71, a cylinder 83 is employed and which is formed with a passage 84 having its opposite ends communicating with the different ends of the cylinders as well as passage 85. A cup member 86 formed with a base perforated as at 87 is slidably mounted in this cylinder and has secured to it a rod 88 capable of being conveniently shifted by manual effort. The inner face of this cup member is formed with a series of grooves 89 of a length greater than the width of a piston 90 disposed within the cup member. This piston is formed with passages 91 connected to the bore 92 of shaft 71.

It will now be observed that shaft 10 may, through a gear 93, drive a pump unit 94. From the latter extend lines 95 and 96 connected respectively to the sump and to passage 85. Thus, with the mechanism operating, fluid under pressure will, at all times, flow through passage 85 and if the parts are in the position shown this fluid will flow into both ports of the cylinder 83, through passage 84, and enter grooves 89, from whence it will flow to passage 91 and so into passage 92. If, now, rod 88 is moved to the right as viewed in Fig. 1, the cup member 86 will be correspondingly shifted and oil or other fluid will be free to flow through openings 87 to groove 89. However, the other face of the piston will be moved relative to the cup member so that, in effect, a restricted passage is provided. This will result in a differential in the pressure of fluid on the two sides of the piston and will cause shaft 71 to shift to the right as viewed in Fig. 1. This movement will continue until cup member 86 is stationary and the piston 90 again assumes a relative position with respect thereto, such as has been illustrated in Fig. 1. A movement of the cup member to the left as viewed in this figure will, of course, shift shaft 71 to the left, due to a reversing of the forces and of the several parts just described and the fact that the piston forms a fixed part of the shaft.

Finally, it is to be observed that as shown a driven shaft 11 may have slidably keyed to it a gear 97. This gear is provided with a clutch portion 98 adjacent its inner face and for engagement with a corresponding clutch portion 99, forming a part of a gear 100. The latter is fixed with respect to shaft 19 and clutch portions 98—99 may be engaged by shifting gear 97 through a suitable control (not shown) which may conveniently engage shifting collar 101. Gear 100 engages a gear 103 which forms a part of sleeve 68 and this sleeve may also have as a part of its body a gear 104, the teeth of which drive gear 97 through idler 106. The several parts are, of course, anti-frictionally mounted by suitable bearings generally indicated at 102 and which conveniently may be of the roller or ball bearing types and various forms of couplings which are wear compensating may be provided. These have not been described in detail in that they are clearly indicated and are well understood by those skilled in the art.

In operation, assuming that the parts are in the position shown in Fig. 1, it will be understood that a rotation of shaft 10 will cause a rotation of gear 12 and a driving of gears 13 and 16. With gear 97 in the position illustrated, no resistance to movement will be offered shaft 19 and consequently the resistance offered by pistons 24 will assure that eccentric 20 will not turn and consequently the cage 15 will remain stationary. Thus shaft 19 will rotate in a direction reverse to that of shaft 10 and at a higher speed. If, now, gear 97 is shifted to the left as viewed in Fig. 1, to cause an engagement between clutch portions 98 and 99, a continued operation of the parts in this manner may, or may not follow. This will be dependent upon the resistance to the movement offered by shaft 11 which now is directly coupled through gear 97 and the clutch portions to gear 100 directly mounted by shaft 19.

Assuming that the resistance offered by shaft 11 is considerable, it follows that this resistance will be evidenced by a corresponding resistance to turning on the part of shaft 19 and this will, in turn, be transmitted by gear 18 to gear 16 and 13 as well as cage 15. Thus, where heretofore the pump has furnished a fixed reaction point such that a drive occurred directly from shaft 10 through the gears to shaft 19, this reaction point will now no longer be fixed, this depending upon the resistance to turning offered by shaft 11 and the adjustment of parts.

For the moment ignoring the manner in which the motor may be adjusted, it will be obvious that under these conditions eccentric 20 will cause pistons 24 to be reciprocated within cylinders 23 so that for substantially 180 degrees of turning of eccentric 20 a suction stroke will occur within each cylinder, while throughout substantially another 180 degrees a compression stroke will be occurring. Cam 21 being fixed with respect to the eccentric and properly timed, it of course follows, if the valve mechanisms are arranged as shown, that during the first stroke rods 37 will increasingly thrust the outermost cup members 40 from their seats 43 and thus permit of a flow of liquid (which shall preferably be oil) from passage 30 to passage 29.

Now it will, of course, be understood that all of the high pressure passages 31 are interconnected or actually form one continuous passage and that this is also true of the low pressure passages 30. Cam 52 will time the valve mechanisms associated with the motor in such a manner that they are open to admit fluid to a cylinder within which a piston is performing a working stroke and couple the same to high pressure passages 31. In turn the valve mechanisms of the pump will be actuated so that passages 31 are coupled to those cylinders of the pump within which fluid is being compressed. Obviously, the reverse is true, i. e., as fluid is exhausted from the motor cylinders through passages 105, the outermost cup member of a valve assembly in association with that cylinder will permit communication with passages 30 and the valve mechanisms of the pump and which are associated with cylinders performing their suction strokes will have their outermost cup members unseated to allow the fluid to flow through passages 29.

Thus the pistons 53 of the motor will react upon eccentrics 61 and 60 to drive the latter, and these will in turn function through pin 62 and extension 63 to drive gears 64 and 66. Such driving force will be transmitted to gears 78 and 79 and through them to sleeves 74 and 75. The sleeves being coupled to members 72 and 73 which are oppositely and equally pitched, it will be obvious that shaft 71 will be turned to thus drive sleeve 68. Consequently, gear 103 will drive gear 100 and the latter being clutched as at 98—99 to gear 101, shaft 11 will be driven. Of course, as the parts rotate, a certain amount of drive will occur directly through gears 12, 13, 16 and 18, and be transmitted to gear 100, this depending entirely upon the resistance to movement offered by shaft 11 and the adjustment of the motor.

Assuming that an operator finds that decreasing driving force is required due to the lighter resistance to movement offered by shaft 11, he may obviously decrease the torque transmitted while increasing the speed of shaft 11 (it being always assumed that the speed of shaft 10 will remain substantially constant) by simply adjusting the motor structure. In other words, he will decrease the stroke of pistons 53. This is accomplished in the illustrated embodiment by simply adjusting the manually operable rod 88 outwardly. This may be effected without any appreciable effort. As heretofore seen, such outward movement causes a corresponding movement on the part of shaft 71. Axial movement of the latter causes an equal turning of sleeves 74 and 75 in opposite directions and gears 64 and 66 being of equal diameter it occurs that eccentrics 60 and 61 are turned in opposite directions and by an equal amount. This may, as shown, be continued to a point at which these eccentrics would nullify each other or, in other words, pistons 53 would have no stroke. Under such circumstances the fluid expelled by the pump would be trapped within the motor cylinders and the pistons of the latter, being incapable of movement, would prevent any flow, so that the pump would remain stationary and furnish a fixed reaction point to assure of a substantially complete drive through the gearing between shafts 10 and 19. Under such circumstances, shaft 11 will operate at maximum speed and develop minimum torque, it being understood that with the parts adjusted as illustrated maximum torque is developed.

Consequently, an operator may vary the speed and driving force exerted by shaft 11 by simply resorting to the adjustment afore referred to, it being apparent that the shorter the stroke of pistons 53, the greater the speed of shaft 11 will be, while the longer the stroke of these pistons the greater the torque developed. Of course, under all circumstances it is obvious that manual or other adjustment does not interfere with, or cause, a turning of gear 67. Thus, cam 52 remains at all times properly co-related to the movements of the pistons within the cylinders.

In conclusion it will be understood that with gear 97 in the position shown, the parts are in neutral position. However, it might very well not be feasible to engage gear 97 with driving elements in view of the likelihood of damaging the parts. It is with this thought in mind that control 48 has been provided and which, when actuated by lever 49 or otherwise serves to establish an actual "neutral" condition. In other words, with the ring shifted to cause the cam or wedge portions 50 to project rods 37 outwardly, the high pressure passages 31 will remain sealed but constant communication will be afforded between the low pressure passages 30 and passages 29. Accordingly, conceding that there is any resistance to turning on the part of driven shaft 11, the pump pistons will simply work back and forth without creating any effective pressures. Thus gear 97 may be shifted to the left to engage clutch portions 98 and 99 to assure a forward driving of the parts, or may be shifted to the right as viewed in Fig. 1. When so shifted, it will engage with the teeth of the gear 106 which is in constant mesh with gear teeth 104 and will thus cause a reverse driving of shaft 111.

It will, of course, be obvious that if the coupling between shafts 12 and 19 did not provide for a reverse movement as well as an overdrive, that a somewhat impossible commercial condition would be presented. In other words, under those circumstances, if the driven shafts 11 and 19 were maintained substantially stationary, the planetary assembly would have a rotational speed many times in excess of that of driving shaft 10 and such a condition is to be avoided.

Thus, among others, the several objects of the invention as afore noted are achieved. Obviously numerous changes in construction and rearrangement of the parts might be resorted to without departing from the spirit of the invention as defined by the claims.

Having described my invention, what I claim as new and desire to secure by Letters Patent is:

1. A transmission including a driving and a driven shaft, a planetary gear assembly, a cage forming a part of said assembly, an eccentric coupled to said cage, a pump including a radial series of cylinders, pistons disposed within said cylinders and operated by said eccentric, a further shaft, one of the elements of said planetary assembly being coupled to said further shaft, a motor including a radial series of cylinders, pistons disposed within the same, an eccentric assembly comprising a plurality of units and coupled to said pistons to be driven thereby, and means for coupling said further shaft and said eccentric to said driven shaft.

2. A transmission including a driving and a driven shaft, a planetary gear assembly, a cage forming a part of said assembly, an eccentric coupled to said cage and extending in advance of said assembly and encircling said driving shaft, a pump including a radial series of cylinders also arranged in advance of said planetary assembly and enclosing said eccentric, pistons disposed within said cylinders and operated by said eccentric, a further shaft, one of the elements of said planetary assembly being coupled to said further shaft, a motor including a radial series of cylinders, pistons disposed within the same, an eccentric assembly comprising a plurality of units and coupled to said pistons to be driven thereby, and means for coupling said further shaft and said eccentric to said driven shaft.

3. A transmission including a driving and a driven shaft, a planetary gear assembly, a cage forming a part of said assembly, an eccentric coupled to said cage, a pump including a radial series of cylinders, pistons disposed within said cylinders and operated by said eccentric, a further shaft, one of the elements of said planetary assembly being coupled to said further shaft, a motor including a radial series of cylinders, pistons disposed within the same, an eccentric assembly comprising a plurality of units and coupled to said pistons to be driven thereby, means for adjusting the parts of said eccentric assembly to cause the pistons of said motor to have variable travel, and means coupling said last named means and said further shaft to said driven shaft to operate the latter.

4. A transmission including a driving shaft, a driven shaft, and a further shaft interposed between said driving and said driven shafts, gearing including at least three elements, one coupled to said driving shaft, one to said further shaft and one connecting said first and last named elements, a pump coupled to said connecting element and to be actuated thereby, means for connecting said further shaft with said driven shaft, a motor, means connecting said motor with said driven shaft, said transmission being formed with high and low pressure passages extending between said pump and motor, valves interposed within said passages and operating in timed relationship with respect to said pump and motor, and means for rendering said valves inoperative.

5. A transmission including a driving shaft, a driven shaft, and a further shaft interposed between said driving and said driven shafts, gearing including at least three elements, one coupled to said driving shaft, one to said further shaft and one connecting said first and last named elements, a pump coupled to said connecting element and to be actuated thereby, means for connecting said further shaft with said driven shaft, a motor, means connecting said motor with said driven shaft, said transmission being formed with high and low pressure passages extending between said pump and motor, valves interposed within said passages and operating in timed relationship with respect to said pump and motor, and means associated with said valves to shift the latter to positions such that constant communication will be provided between said pump and said low pressure passages.

6. A transmission including a driving shaft, a driven shaft, and a further shaft interposed between said driving and said driven shafts, gearing including at least three elements, one coupled to said driving shaft, one to said further shaft and one connecting said first and last named elements, a pump coupled to said connecting element and to be actuated thereby, means for connecting said further shaft with said driven shaft, a motor, means connecting said motor with said driven shaft, said transmission being formed with high and low pressure passages extending between said pump and motor, valves interposed within said passages, each of said valves including a pair of cup-shaped members, seats for said members, and providing in cooperation therewith line seals, said members being disposed in opposed relationship, and springs for normally retaining said members in seated position.

7. A transmission including a driving shaft, a driven shaft and a further shaft interposed between said driving and said driven shafts, a gearing including at least three elements, one coupled to said driving shaft, one to said further shaft, and one connecting said first and last named elements, a pump coupled to said connecting element and to be actuated thereby, means for connecting said further shaft with said driven shaft, a motor, means connecting said motor with said driven shaft, said transmission being formed with high and low pressure passages extending between said pump and motor, valves interposed within said passages, each of said valves including a pair of cup-shaped members, seats for said members and providing in cooperation therewith line seals, said members being disposed in opposed relationship, springs for normally retaining said members in seated position, the base portions of said members being formed with openings through which fluid may flow, and one of said passages extending between said members, the inward and outward exposed areas of each of said members being substantially equal to each other whereby a structure is presented such that said members will substantially balance each other.

8. A transmission including a driving shaft, a driven shaft, and a further shaft interposed between said driving and said driven shafts, gearing including at least three elements, one coupled to said driving shaft, one to said further shaft and one connecting said first and last named elements, a pump coupled to said connecting element and to be actuated thereby, means for connecting said further shaft with said driven shaft, a motor, means connecting said motor with said driven shaft, said transmission being formed with high and low pressure passages extending between said pump and motor, valves interposed within said passages, each of said valves including a pair of cup-shaped members, seats for said members, and providing in cooperation therewith line seals, said members being disposed in opposed relationship, springs for normally retaining said members in seated position, one of said passages extending between said members, a rod extending axially of said members, an abutment forming a part of said rod and engageable with said members to seat the same, and means for shifting said rod.

9. A transmission including a driving shaft, a driven shaft, and a further shaft interposed between said driving and said driven shafts, gearing including at least three elements, one coupled to said driving shaft, one to said further shaft and one connecting said first and last named elements, a pump coupled to said connecting element and to be actuated thereby, means for connecting said further shaft with said driven shaft, a motor, means connecting said motor with said driven shaft, said transmission being formed with high and low pressure passages extending between said pump and motor, valves interposed within said passages, each of said valves including a pair of cup-shaped members, seats for said members, and providing in cooperation therewith line seals, said members being disposed in opposed relationship, springs for normally retaining said members in seated position, one of said passages extending between said members, a rod extending axially of said members, an abutment forming a part of said rod and engageable with said members to seat the same, means for shifting said rod in one direction, and a further spring cooperating with said rod for urging the same in an opposite direction.

10. A transmission including a driving shaft, a driven shaft and a further shaft extending between said first named shafts, a planetary including gears coupled to said driving and further shafts, a cage forming a part of said planetary, gears mounted by said cage and coupling said shafts, an eccentric coupled to said cage and rotating therewith, a pump, pistons forming a part of said pump and driven by said eccentric, a motor, an eccentric forming a part of said motor and encircling said further shaft, pistons within the cylinders of said motor and cooperating with said eccentric, means for coupling said further shaft with said driven shaft, means for connecting said eccentric with said driven shaft, said transmission including high and low pressure passages extending between said pump and motor cylinders, a series of valves for said motor and corresponding in number to the number of cylinders therein, a series of valves for said pump and also corresponding in number to the cylinders of the latter, and means connected to the eccentrics of both said pump and motor for operating said valves in timed relationship to the movements of the pistons within the cylinders and to which said valves are connected to control the flow of fluid through said passages.

11. A transmission including a driving shaft, a driven shaft, and a further shaft extending between said first named shafts, a planetary including gears coupled to said driving and further shafts, a cage forming a part of said planetary gears mounted by said cage and including a gear of relatively small diameter engaging the teeth of the gear on the driving shaft, a gear of larger diameter meshing with the first named gear of the planetary and with the teeth of the gear on the driven shaft to couple said shafts, an eccentric coupled to said cage and rotating therewith, a pump, pistons forming a part of said pump and driven by said eccentric, a motor, an eccentric forming a part of said motor and encircling said further shaft, pistons within the cylinders of said motor and cooperating with said eccentric, means for coupling said further shaft with said driven shaft, means for connecting said eccentric with said driven shaft, said transmission including high and low pressure passages extending between said pump and motor cylinders, a series of valves for said motor and corresponding in number to the number of cylinders therein, a series of valves for said pump and also corresponding in number to the cylinders of the latter, and means connected to the eccentrics of both said pump and motor for operating said valves in timed relationship to the movements of the pistons within the cylinders and to which said valves are connected to control the flow of fluid through said passages.

12. A transmission including a driving shaft, a driven shaft and a further shaft extending between said first named shafts, a planetary including gears coupled to said driving and further shafts, a cage forming a part of said planetary, gears mounted by said cage and coupling said shafts, an eccentric coupled to said cage and rotating therewith, a pump, pistons forming a part of said pump and driven by said eccentric, a motor, an eccentric forming a part of said motor and encircling said further shaft, pistons within the cylinders of said motor and cooperating with said eccentric, means for coupling said further shaft with said driven shaft, means for connecting said eccentric with said driven shaft, said transmission including high and low pressure passages extending between said pump and motor cylinders, a series of valves for said motor and corresponding in number to the number of cylinders therein, a series of valves for said pump and also corresponding in number to the cylinders of the latter, means connected to the eccentrics of both said pump and motor for operating said valves in timed relationship to the movements of the pistons within the cylinders and to which said valves are connected to control the flow of fluid through said passages, and means for varying the range of travel of said motor pistons.

13. A transmission including a driving shaft, a driven shaft, and a further shaft extending between said first named shafts, a planetary gear set including gears coupled to said driving and further shafts, a cage forming a part of said planetary gear set, gears mounted by said cage and coupling said shafts, an eccentric coupled to said cage and rotating therewith, a pump, pistons forming a part of said pump and driven by said eccentric, a motor, an eccentric forming a part of said motor and encircling said further shaft, pistons within the cylinders of said motor and cooperating with said eccentric, means for coupling said further shaft with said driven shaft, means for connecting said eccentric with said driven shaft, said transmission including high and low pressure passages extending between said pump and motor cylinders, a series of valves for said motor and corresponding in number to the number of cylinders therein, a series of valves for said pump and also corresponding in number to the cylinders of the latter, means connected to the eccentrics of both said pump and motor for operating said valves in timed relationship to the movements of the pistons within the cylinders and to which said valves are connected to control the flow of fluid through said passages, means for varying the range of travel of said motor pistons, means for rendering said pump inoperative to pass fluid to said motor, and means for causing a reverse movement of said driven shaft.

14. A variable speed transmission comprising in combination a driving shaft, a driven shaft, a mechanical drive for said shafts and comprising a differential mechanism forming a torque applying driving connection including three interconnected elements, two of said elements being coupled respectively to said shafts, and the third element being displaceable relative to said two elements, a hydraulic drive forming a part of such transmission and including a system in which slippage is substantially absent irrespective of the viscosity, temperature, and pressure of the power-transmitting fluid in such system, said drive comprising a pump unit operatively connected to the third element of said differential mechanism, a motor unit operatively connected to said driven shaft, means whereby at least one of said units may have its capacity varied, means providing a high pressure passage for the flow of fluid from said pump to said motor, means providing a low pressure passage extending from said motor to said pump, at least said high pressure passage being free from valvular, pressure-affecting constrictions, said pump and motor each including a plurality of cylinders and pistons reciprocable within said cylinders whereby the reaction of the pistons upon said cylinders enable said motor to apply driving torque to said driven shaft, and in addition to the driving torque applied to said shaft through the mechanical drive provided by said differential mechanism, pairs of valves corresponding in number to and disposed adjacent each cylinder of the pump and motor, one of the valves of each pair controlling the flow of fluid between the cylinder with which it is associated and the high pressure passage, the other valve of such pair controlling fluid flow between such cylinder and the low pressure passage, means causing timed movements of the valves of each cylinder with respect to the movements of the piston within such cylinder, each of said valves including a relatively movable seat element and body element, each such element presenting surfaces cooperable with the surfaces of the adjacent element and means assuring a relative movement of such surfaces towards each other to interrupt the flow of fluid between the same, whereby leakage is substantially precluded irrespective of the viscosity, temperature and the pressure of such fluid.

15. A variable speed transmission comprising in combination a driving shaft, a driven shaft, a mechanical drive for said shafts and comprising a differential mechanism forming a torque applying driving connection including three interconnected elements, two of said elements being coupled respectively to said shafts, and the third element being displaceable relative to said two elements, a hydraulic drive forming a part of such transmission and including a system in which slippage is substantially absent irrespective of the viscosity, temperature and pressure of the power-transmitting fluid in such system, said drive comprising a pump unit operatively connected to the third element of said differential mechanism, a motor unit operatively connected to said driven shaft, means whereby at least one of said units may have its capacity varied, means providing a high pressure passage for the flow of fluid from said pump to said motor, means providing a low pressure passage extending from said motor to said pump, at least said high pressure passage being free from valvular, pressure-affecting constrictions, said pump and motor each including a plurality of cylinders and pistons reciprocable within said cylinders whereby the reaction of the pistons upon said cylinders enable said motor to apply driving torque to said driven shaft, and in addition to the driving torque applied to said shaft through the mechanical drive provided by said differential mechanism, pairs of valves corresponding in number to and disposed adjacent each cylinder of the pump and motor, one of the valves of each pair controlling the flow of fluid between the cylinder with which it is associated and the high pressure passage, the other valve of such pair controlling fluid flow between such cylinder and the low pressure passage, means causing timed movements of the valves of each cylinder with respect to the movements of the piston within such cylinder, each of said valves including a relatively movable seat element and body element, each such element presenting surfaces cooperable with the surfaces of the adjacent element, means assuring a relative movement of such surfaces towards each other to interrupt the flow of fluid between the same, whereby leakage is substantially precluded irrespective of the viscosity, temperature and the pressure of such fluid, means providing recesses for the guidance and housing of each of said valve bodies, said recesses and bodies each presenting wall portions, and a packing associated with one of said wall portions and slidably engageable with the second of the same to provide a seal guarding against fluid leakage between said wall portions.

16. A variable speed transmission comprising in combination a driving shaft, a driven shaft, means coupling said shafts, and including a torque applying driving connection comprising a pump unit operatively connected to said driving shaft, a motor unit operatively connected to said driven shaft, means whereby at least one of said units may have its capacity varied, means providing high pressure passages for the flow of fluid from said pump to said motor, means providing low pressure passages for the flow of fluid from said motor to said pump, at least said high pressure passages being free from valvular, pressure-effecting constrictions, said pump and motor each including a plurality of cylinders and pistons reciprocable within said cylinders whereby the reaction of the pistons of the pump and motor units upon the cylinders thereof enable said motor to apply driving torque to said driven shaft, pairs of valves corresponding in number to and disposed adjacent each cylinder of the pump and motor, one valve of said pair controlling the flow of fluid between the cylinder with which it is associated and the high pressure passage, the other valve of such pair controlling fluid flow between such cylinder and the low pressure passage, means causing timed movements of the valves of each cylinder with respect to the movements of the piston within such cylinder, each of said valves including a seat element and a body element, each of said elements presenting surfaces cooperable with the surface of the adjacent element and means assuring a movement of such surfaces towards each other to interrupt the flow of fluid between such surfaces whereby leakage and slippage is substantially prevented irrespective of the viscosity, temperature and pressure of the power transmitting fluid in such transmission.

17. A variable speed transmission comprising in combination a driving shaft, a driven shaft, means coupling said shafts, and including a torque applying driving connection comprising a pump unit operatively connected to said driving shaft, a motor unit operatively connected to said driven shaft, means whereby at least one of said units may have its capacity varied, means providing high pressure passages for the flow of fluid from said pump to said motor, means providing low pressure passages for the flow of fluid from said motor to said pump, at least said high pressure passages being free from valvular, pressure-effecting constrictions, said pump and motor each including a plurality of cylinders and pistons reciprocable within said cylinders whereby the reaction of the pistons of the pump and motor units upon the cylinders thereof enable said motor to apply driving torque to said driven shaft, pairs of valves corresponding in number to and disposed adjacent each cylinder of the pump and motor, one valve of said pair controlling the flow of fluid between the cylinder with which it is associated and the high pressure passage, the other valve of such pair controlling fluid flow between such cylinder and the low pressure passage, means causing timed movements of the valves of each cylinder with respect to the movements of the piston within such cylinder, each of said valves including a seat element and a body element, each of said elements presenting surfaces cooperable with the surface of the adjacent element and means assuring a movement of such surfaces towards each other to interrupt the flow of fluid between such surfaces whereby leakage and slippage is substantially prevented irrespective of the viscosity, temperature and pressure of the power-transmitting fluid in such transmission, and said valve bodies being formed with openings whereby fluid may flow through the same and act on opposed surfaces of said bodies to balance the latter with respect to the fluid pressure, whereby such valve may be moved without causing pumping of fluid or without having to overcome fluid pressure and, moreover, whereby said fluid pressure produces no effective tendency of said valve to move.

18. A variable speed transmission comprising in combination a driving shaft, a driven shaft, means coupling said shafts, and including a torque applying driving connection comprising a pump unit operatively connected to said driving shaft, a motor unit operatively connected to said driven shaft, means whereby at least one of said units may have its capacity varied, means providing high pressure passages for the flow of fluid from said pump to said motor, means providing low pressure passages for the flow of fluid from said motor to said pump, at least said high pressure passages being free from valvular, pressure-effecting constrictions, said pump and motor each including a plurality of cylinders and pistons reciprocable within said cylinders whereby the reaction of the pistons of the pump and motor units upon the cylinders thereof enable said motor to apply driving torque to said driven shaft, pairs of valves corresponding in number to and disposed adjacent each cylinder of the pump and motor, one valve of said pair controlling the flow of fluid between the cylinder with which it is associated and the high pressure passage, the other valve of such pair controlling fluid flow between such cylinder and the low pressure passage, means causing timed movements of the valves of each cylinder with respect to the movements of the piston within such cylinder, each of said valves including a seat element and a body element, each of said elements presenting surfaces cooperable with the surface of the adjacent element and means assuring a movement of such surfaces towards each other to interrupt the flow of fluid between such surfaces whereby leakage and slippage is substantially prevented irrespective of the viscosity, temperature and pressure of the power-transmitting fluid in such transmission, means providing recesses for the guidance and housing of each of said valve bodies, said recesses and bodies each presenting wall portions, and a packing associated with one of said wall portions and slidably engageable with the second of the same to provide a seal guarding against fluid leakage between said wall portions.

19. A variable speed transmission comprising in combination, a driving shaft, a driven shaft, a mechanical drive for said shafts and including a differential mechanism forming a torque applying driving connection between said shafts and including inter-connected elements, the last one of which is displaceable relative to the others, the others being coupled respectively to said shafts, a hydraulic drive forming a part of such transmission and including a system in which slippage is substantially absent irrespective of the viscosity, temperature and pressure of the power-transmitting fluid in such system, said drive comprising a pump united operatively connected to the displaceable elements of said differential mechanism, a motor unit operatively connected to said driven shaft, means whereby at least one of said units may have its capacity varied, means providing a high pressure passage for the flow of fluid from said pump to said motor, means providing a low pressure passage extending from said motor to said pump, at least said high pressure passage being free from valvular, pressure-effecting constrictions, said pump and motor each including a plurality of cylinders and pistons reciprocable within said cylinders whereby the reaction of the pistons upon said cylinders enables said motor to apply driving torque to said driven shaft, and in addition to the driving torque applied to said shaft through the mechanical drive provided by said differential mechanism, pairs of valves corresponding in number to and disposed adjacent each cylinder of the pump and motor, one of the valves of each pair controlling the flow of fluid between the cylinder with which it is associated and the high pressure passage, the other valve of such pair controlling fluid flow between such cylinder and the low pressure passage, means causing timed movements of the valves of each cylinder with respect to the movements of the piston within such cylinder, each of said valves including a relatively movable seat element and body element, each such element presenting surfaces cooperable with the surface of the adjacent element and means assuring a movement of such surfaces towards each other to interrupt the flow of fluid between such surfaces whereby leakage and slippage is substantially prevented irrespective of the viscosity, temperature and pressure of the power-transmitting fluid in such transmission, and said valve bodies being formed with openings whereby fluid may flow through the same and act on opposed surfaces of said bodies to balance the latter with respect to the fluid pressure, whereby such valve may be moved without causing pumping of fluid or without having to overcome fluid pressure, and, moreover, whereby said fluid pressure produces no effective tendency of said valve to move.

ELIAS ORSHANSKY, Jr.